Patented Apr. 28, 1931

1,802,336

UNITED STATES PATENT OFFICE

LEON W. COOK, OF ROSELLE, NEW JERSEY, ASSIGNOR TO THE TEXAS COMPANY, OF NEW YORK, N. Y., A CORPORATION OF DELAWARE

NAPHTHENIC ACID

No Drawing.    Application filed September 25, 1928.    Serial No. 308,333.

This invention relates to a method of recovering naphthenic acids from petroleum oils and has particular reference to a process of recovering the organic or naphthenic acids from the residues resulting from distillation of the heavier fractions of petroleum, where such distillations have been carried out in the presence of alkali; the process has particular application to residues derived from the vacuum distillation of lubricating oils.

In the usual methods of recovering naphthenic acids from alkaline still bottoms, the use of a solvent such as alcohol is generally resorted to, to separate the alkali soaps of naphthenic acids from the residual oil. This operation results in the consumption of considerable quantities of the alcohol solvent and renders the process relatively expensive. In accordance with my invention, I may dispense with the use of a solvent and may recover the naphthenic acid content of the still bottoms in relatively pure state without incurring this expense. The process comprises agitating the still bottoms with the requisite quantity of water, thereby forming a mixture or emulsion, which upon acidifying using an excess of mineral acid will separate into an oily layer and a watery layer which can then be separated, the naphthenic acids remaining in the oily layer. This material may then be subjected to distillation under high vacuum and the condensate from distillation collected until an amount is obtained equivalent to the precalculated content of naphthenic acids.

As further illustrating the invention, the following specific example may be given:

About 20 pounds of still bottoms derived from the vacuum distillation of lubricating oils over caustic may be charged into an agitator with about 10 gallons of water and agitated with heating until the still bottoms have become disintegrated. About 1000 cc. of concentrated hydrochloric acid (or corresponding amount of other strong mineral acid) is then added and the mixture is thoroughly mixed. Upon allowing the mixture to stand, it will be found to separate into an aqueous layer and an oily layer, which are then separated and the oily layer charged to a vacuum still. This mixture is distilled, preferably while drawing a small current of air or other neutral gas through the material to remove the last traces of water. After the water has been removed the distillation may be carried on under high vacuum with steam. Still temperatures range between 200° and 250° C. and the vacuum between 20 and 40 millimeters. Distillation is continued until the precalculated content of naphthenic acids has been distilled and collected as a condensate. The resulting acids may be separated from the water by siphoning or other suitable means and further dried by heating and blowing with a current of air.

What I claim is:

1. The method of recovering naphthenic acids from alkaline petroleum distillation residues, which comprises agitating the residues with water, adding a strong mineral acid in an amount in excess of that necessary to effect neutralization, allowing the mixture to stratify into an oily layer and a watery layer, separating the two layers, and distilling the oily layer under high vacuum until the amount of distillate collected corresponds to the precalculated content of naphthenic acids.

2. The method of recovering naphthenic acids from alkaline petroleum distillation residues, which comprises agitating the residues with water, adding a strong mineral acid in an amount in excess of that necessary to effect neutralization, allowing the mixture to stratify into an oily layer and a watery layer, separating the two layers, and distilling the oily layer under high vacuum whereby the naphthenic acids are separated from associated mineral oil.

In witness whereof I have hereunto set my hand this 19th day of September, 1928.

LEON W. COOK.